United States Patent [19]

Zettl

[11] Patent Number: 4,724,995
[45] Date of Patent: Feb. 16, 1988

[54] PIN JOINING METHOD AND APPARATUS

[76] Inventor: Friedrich Zettl, Ettlinger Strasse 37, 7531 Keltern, Fed. Rep. of Germany

[21] Appl. No.: 890,568

[22] Filed: Jul. 25, 1986

[30] Foreign Application Priority Data

Jul. 29, 1985 [DE] Fed. Rep. of Germany ....... 3527148

[51] Int. Cl.<sup>4</sup> ......................... B23K 31/02; B23K 1/02
[52] U.S. Cl. .................... 228/218; 228/244; 228/6.1; 228/47; 228/902; 29/160.6
[58] Field of Search ................ 228/61, 218, 242, 244, 228/41, 44.3, 49.1, 47, 902; 29/160.6

[56] References Cited

U.S. PATENT DOCUMENTS

| 1,679,180 | 7/1928 | Sterk ................................. 29/160.6 |
| 1,966,200 | 7/1934 | Eskilson ............................ 228/244 |
| 4,230,257 | 10/1980 | Genson ............................ 228/244 |
| 4,458,401 | 7/1984 | Graham ........................... 29/160.6 |

FOREIGN PATENT DOCUMENTS 59288  1/1913  Austria ............................. 29/160.6

Primary Examiner—Kurt Rowan

[57] ABSTRACT

In a method and apparatus for the automatic joining of pins to the surfaces of articles, especially of ear pins to associated pieces of jewelry, the joining step utilizes flame soldering in the automatic joining process in order to reduce costs for small lot manufacturing and firm joining of the pin to the article. The apparatus has an article receptacle movably disposed on a base plate which also carries a solder supply gun, a pin supply and support structure and a soldering flame nozzle, all being movable between a remote rest position and an operating position in which they are properly located for performing the pin soldering task.

6 Claims, 1 Drawing Figure

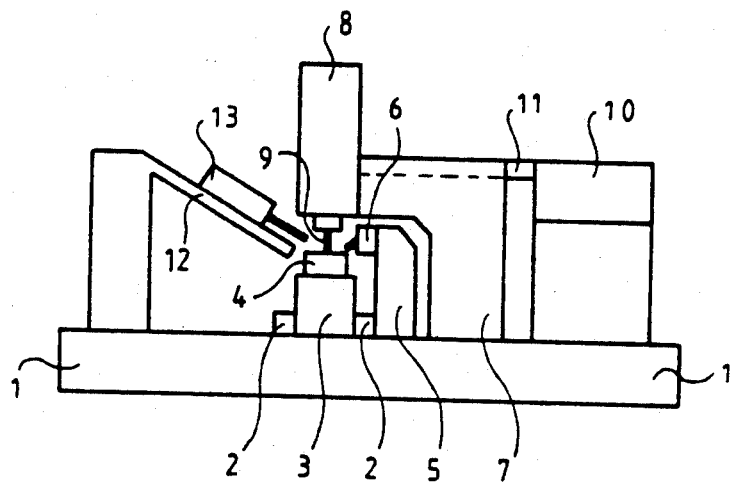

PIN JOINING METHOD AND APPARATUS

The invention relates to a method for the automatic joining of pins with objects provided with mounting plates particularly for the joining of an ear pin with the associated jewelry article and to an apparatus for performing the method.

The joining of pins with articles provided with a mounting plate or surface to which the pin is to be joined is a simple procedure for manual operation; however, the procedure becomes quite difficult when the method needs to be performed automatically. This is especially true for jewelry articles such as ear pendants with pins, wherein difficulties are caused not only because of the shape of the articles because the joint's appearance has to be neat but also by the type of materials of which the articles or the pins to be joined therewith are generally made. Especially in connection with jewelry articles it is to be noted that no damage must occur by the joining procedure as their appearance must not be impaired because any such impairment will make the article valueless. Jewelry articles manufactured in small numbers are therefore still made by hand wherein the pin is soldered to the mounting surface of the article.

For large volume automatic manufacture of such joints there are two methods known in the art:

1. The welding of the pins onto the mounting surface;
2. he use of a soldering method wherein the articles and the solder material are heated by means of an induction coil.

Welding is a relatively simple technique and has become a successful joining method in many fields. It is to be taken into consideration however that with this joining method the members to be joined must consist of weldable materials, that is, that the material combination must permit welding. Also, there must be the possibility to conduct the welding current into the members to be joined and the joint must have a good appearance. It is however quite difficult to conduct the required welding current into the jewelry members to be joined since even the smallest air gaps between the current conducting electrode and the jewelry member causes sputtering which results in damage to the surface of the jewelry portion of the pin: Sputtering may also occur at the jointure of the pin with the mounting plate which would result in an unattractive surface appearance of the weld surface area and rejection of the article. In order to avoid those disadvantages as much as possible, each article requires especially made and shaped tools which must consist of electrode materials and the manufacture of such tools becomes economical only in connection with large manufacturing numbers. But even so, sputtering at the jointure and the associated ugly joint appearance can hardly be avoided.

Welding can therefore be used as a joining method only for low-priced jewelry or ear pendants and only if they are manufactured in large numbers.

If induction heat soldering is utilized as a joining method, the members to be joined have to be heated by a high frequency induction coil while the soldering material is disposed between the members. This again requires relatively expensive different tools for differently shaped members. Also the supply and the removal of the materials and the finished articles is quite difficult since, during the joining process, the members to be joined have to be surrounded by the induction coil. Joining of the members by induction heated soldering is therefore also quite expensive because of the need for special apparatus and equipment which is relatively difficult to make, that is, the need for relatively expensive tooling.

It is therefore the object of the present invention to provide a method and apparatus for the joining of such members which does not require the use of complicated and therefore expensive tools and which as a result can be used economically in the manufacture of small manufacturing lots.

SUMMARY OF THE INVENTION

A method and apparatus for the automatic joining of pins to the surface of the articles, especially ear pins to an associated piece of jewelry, utilize in the joining step flame soldering in connection with an apparatus which automatically performs all the required operating steps. The apparatus has disposed on a base plate an article receptacle which is movable between a soldering location and a remote article inserting and removing location, a solder supply mechanism movable to the soldering location for applying the appropriate amount of solder material to the surface of the article, a pin supply and support structure for bringing the pin to the article and holding it in the proper position for soldering and a soldering flame nozzle movable between a remote and a flame soldering position at the soldering location, all operating steps being timed and controlled by a controller, generally, a simple cam operated valving mechanism for controlling the operation of pneumatic pistons and cylinders associated with the various two-position components for their operation.

As a result the automatic joining process is no longer by way of welding or induction soldering but by way of flame soldering. Flame soldering is an old operation but has always been used only for manual joining operations in connection with operations under consideration. In contrast to the joining processes mentioned earlier, flame soldering does not require a particular tooling for the joining of particular members but generally only a support structure for properly locating the member to which the pin is to be joined.

It should be pointed out that flame soldering produces also a much better joint than, for example, high frequency soldering or soldering with a soldering plate because the solder material creeps up along the pin providing a somewhat conical jointure at the interface of the mounting surface and the pin and providing thereby for a firm joint and also for inherently smooth joint surface areas. It is however necessary that the member to which the pin is to be joined as well as the pin itself are supported in proper position during the soldering process. The support structure for the members to be joined however does not require the use of expensive special tooling but can be formed simply by a support cavity for supporting the member and a clamping device for holding the pin. Tooling costs are therefore minimal so that also relatively small lot numbers of such ear pendants can be manufactured with automatic manufacturing equipment in an economical manner. Also labor costs are relatively low since little manual labor is required. Compared to manual manufacture the costs are substantially reduced. As a result the jewelry can be manufactured in relatively small numbers with sufficient profit.

For the performance of the method according to the invention the jewelry members are supplied to the soldering location with their mounting surface facing upwardly, pasty solder, powdery solder or wire solder is supplied from sidewardly above by way of a solder cylinder, the pin is subsequently supplied from the top in vertical orientation, and a soldering flame is moved from the side to the soldering location.

An apparatus for performing the various method steps has supported on an apparatus base plate a supply mechanism for supplying the articles to be soldered to the soldering location, a slide having a solder cylinder mounted thereon and adapted to transfer solder material to the soldering surface of the article, a support mechanism for the pin adapted to supply the pin vertically from the top to the soldering location and a movable support structure for the nozzle of the soldering flame. The supply mechanism may be a simple slide member provided with a retaining means for holding the jewelry member in proper position so that, after insertion of the jewelry, the slide member can easily be moved against stops provided on the base plate which stops position the piece of jewelry in the proper soldering location. For larger lot numbers the supply mechanism is preferably a slide member movable back and forth on the base plate between two end portions and provided with an article receptacle arranged at each end thereof. With this article-receiving slide the article may be inserted at one end while the soldering process is performed at the other. After completion of the soldering process the slide is moved to the opposite end position, the soldered article is removed while another is inserted and the previously inserted article now in the soldering location is soldered.

It is of course also possible to provide a turntable which is rotated stepwise and where the article members are inserted in place at one side and the finished articles are removed at the other side.

For the transport of all the components, pneumatic piston and cylinder arrangements may be utilized which may be controlled by a cam operated valve control mechanism, for example.

SHORT DESCRIPTION OF THE DRAWINGS

The single FIGURE shows schematically the arrangement according to the invention.

DESCRIPTION OF THE PREFERRED EMBODIMENT

As indicated in the FIGURE, an apparatus base plate 1 is provided with guides 2 between which a slide member 3 is inserted. The slide member 3 carries a receptacle 4 for the articles to be soldered. The base plate 1 also carries a support structure 5 of the nozzle 6 for a soldering flame by which support structure 5 the nozzle is movable in a direction normal to the plane of representation. The base plate 1 further supports a mounting arm 7 for a pin supply and retaining structure 8 for the pins 9 to be soldered onto the mounting surface of the articles disposed on the receptacle 4. The pins are supplied to the pin supply structure from a pin sorting apparatus 10 which arranges the pins in proper positions and transfers them to the pin supply and retaining structure 8 by way of a channel 11. Also, there is arranged on the base plate 1 an inclined slide track 12 with a slide-mounted solder gun 13 which is longitudinally movable on the slide track 12 toward and from the pin and article soldering joint.

During operation of the apparatus according to the invention the slide member 3 is moved against the stop 2 of the base plate 1 so that the article part held by the receptacle 4 is properly positioned at the soldering location. Then the solder gun 13 is moved by way of the slide 12 close enough that pasty soldering material is applied to the surface to be soldered. The solder gun 13 then returns to its rest position. From the sorting apparatus 10 pins 9 from within are transported to the pin supply and retaining structure 8 by way of the channel 11 and a pin 9 is properly positioned by the retaining structure 8 on the surface of the article part to which it is to be joined. Now the nozzle 6 of the soldering burner is moved to the soldering location. When the area to be soldered is heated sufficiently to cause flowing of the soldering material, the nozzle 6 is returned to its rest position, the liquid soldering material spreads over the pin stem and the adjacent area of the article part and soon solidifies so that the finished article, that is, the article part with the pin firmly soldered thereto, may be removed from the receptacle 4. The whole process is subsequently repeated in the manner described.

What is claimed is:

1. In a method for the automatic joining of pins to the surface of jewelry articles especially for the joining of an ear pin to the associated piece of jewelry, wherein the article to whose surface said pin is to be joined is placed onto a support means which together with the article is moved to a soldering location of a joining apparatus with said surface disposed on top, and pasty soldering material is applied to the soldering surface area from an upper side area by way of a solder gun associated with said apparatus, wherein subsequently the pin is supplied by said apparatus in a vertical position from the top and held seated on said surface, and wherein a soldering flame is then carried in by said apparatus from the side to the soldering location such that the flame is directed toward the soldering location, and the flame is removed after heating of the solder material to a liquid state and wherein, after cooling of the solder, the article with the pin soldered thereto is removed from the soldering location.

2. An apparatus for the automatic joining of pins to the surface of jewelry articles by flame soldering, especially the joining of an ear pin to an associated piece of jewelry, said apparatus comprising an apparatus base plate, means for supporting said articles and being movable on said base plate between two end positions, a remote article inserting position and a predetermined soldering position, a solder gun supported on said base plate so as to be movable between a solder supply position adjacent said soldering location and a rest position remote from said soldering location, a pin support and supply structure mounted on said base and extending over said soldering location and including means for supplying said pin in vertical position to said soldering location and holding it in vertical position resting on said article surface to which it is to be soldered, and means carrying a soldering nozzle and being also mounted on said base plate so as to be movable between a heating position in which the nozzle's flame is directed onto the surface of the article to which said pin is to be joined and a rest position remote therefrom.

3. An apparatus according to claim 2, wherein said movable means for supporting said article is a slide member supported on said base plate so as to be slidable between said article inserting and soldering positions and an article receptacle is disposed on said slide member, and wherein stops are provided on said base so as to locate said slide member in said inserting and soldering positions.

4. An apparatus according to claim 2, wherein said movable means for supporting said article is a slide member supported on said base plate slidably between two end positions and having an article receptacle arranged at each of its opposite ends in a manner that one of said receptacles is in the soldering position in each end position of said slide member while the other receptacle is remote from the soldering position to permit exchange of the article while the article in the one receptacle is soldered.

5. An apparatus according to claim 2, wherein pneumatic drive cylinders and pistons are connected to the various movable components for moving them to and from the soldering location.

6. An apparatus according to claim 5, wherein a cam operated valving arrangement is provided for operating, and timing operation, of said pneumatic drive cylinders and pistons.

* * * * *